TRANSMITTED DATA TIMING RECOVERY SYSTEM

Filed Oct. 28, 1966 5 Sheets-Sheet 1

INVENTOR.
DONALD A. PERREAULT
BY Anthony D. Cennamo
ATTORNEY

4-LEVEL EYE PATTERN AND DATA THRESHOLD TRANSITION TIMES

INVENTOR.
DONALD A. PERREAULT
BY Anthony D. Cennamo
ATTORNEY

INVENTOR.
DONALD A. PERREAULT
BY Anthony D. Cennamo
ATTORNEY

INVENTOR.
DONALD A. PERREAULT
BY Anthony D. Cennamo
ATTORNEY

INVENTOR.
DONALD A. PERREAULT
BY [signature]
ATTORNEY

United States Patent Office 3,512,093

Patented May 12, 1970

3,512,093

TRANSMITTED DATA TIMING RECOVERY SYSTEM

Donald A. Perreault, Pittsford, N.Y., assignor to Xerox Corporation, Rochester, N.Y., a corporation of New York Filed Oct. 28, 1966, Ser. No. 590,357
Int. Cl. H03b *1/00*
U.S. Cl. 328—139 4 Claims

ABSTRACT OF THE DISCLOSURE

This invention relates to data transmission systems and, more particularly, to the recovery of the baud timing of original transmitted data information.

BACKGROUND

At a communications receiver, it is necessary to establish a time reference for properly determining the respective information pulse positions. In prior art transmission systems, synchronization is sometimes produced at a receiver from a synchronizing signal, which is transmitted along with the information signals. This synchronizing signal would be utilized to sample the message wave for determination of the proper pulse positions. The transmission of a separate synchronizing signal unnecessarily adds to the complexity of the transmission equipment in addition to the decreased information volume that can be transmitted due to the part of the bandwidth taken by the signal itself.

Prior art binary or two-state data transmission systems which employ envelope detection without a separate synchronizing signal utilize the mid-point of the symbol transitions, that is, transitions from one data state to another, to recover the data timing information at the receiver. Such transitions are detected by observing the crossings of the decision threshold placed midway between the excursions of the data envelope.

In multilevel data transmission systems, however, the prior art has shown that timing may be recovered by taking the difference between a pair of pilot tones transmitted for that purpose. The transmission of these pilot tones, however, also unnecessary adds to the information to be transmitted thereby increasing the amount of time to transmit such information or decreasing the amount of information to be transmitted per unit time, especially if the transmission medium utilized is of a minimum bandwidth capability. Where multiple thresholds are used to decode the recovered envelope of a multilevel information waveform, many of the envelope transitions cause multiple threshold crossings, thus complicating the extraction of timing information. Such prior art techniques are awkward and expensive which become a serious limitation on the economic usefulness of the data transmission equipment.

OBJECTS

It is, accordingly, an object of the present invention to reduce the operating costs of transmitting binary data information over a limited bandwidth transmission medium.

It is another object of the present invention to increase the efficiency of a data transmission system in which the data envelope is recovered.

It is another object of the present invention to derive a synchronizing signal from transmitted data information.

It is another object of the present invention to provide time synchronization for a received multilevel information signal.

BRIEF SUMMARY OF THE INVENTION

In accomplishing the above and other desired aspects, applicant has invented novel methods and apparatus for recoveringe the information or baud timing of the original data waveform. A single correctly placed timing pulse for each transition of a multilevel band-limited data waveform is produced regardless of which levels the transtion occurs between. That is, the input multilevel data waveform is differentiated and sliced, in accordance with the principles of the present invention, to obtain a single timing pulse regardless of the actual time relation of the threshold crossings between the various levels of the input information waveform.

In accordance with a first embodiment of the invention, the detected waveform after demodulation is differentiated and sliced at positive and negative thresholds to obtain square wave pulses in accordance with the characteristics of the differentiated waveform. The differentiated waveform is differentiated a second time and sliced in accordance with the characteristics of the second differentiated waveform. The twice differentiated waveform is first sliced and then applied to a pulse generator to generate pulses at the transitions of the square wave information from the second slicer. The output from the positive and negative slicers and the pulse generator are ANDed together to obtain one timing pulse at the proper timing interval regardless of the threshold transition in the original waveform. In accordance with a second embodiment, where the transmission medium is of poor quality and overshooting of the transitions has occurred, prepulsing and filtering is provided so that the timing circuit can operate on clean or non-spurious signals.

BRIEF DESCRIPTION OF THE DRAWINGS

For a more complete understanding of the invention, as well as other objects and further features thereof, reference may be had to the following detailed description in conjunction with the drawings wherein.

DETAILED DESCRIPTION

Figure 1:
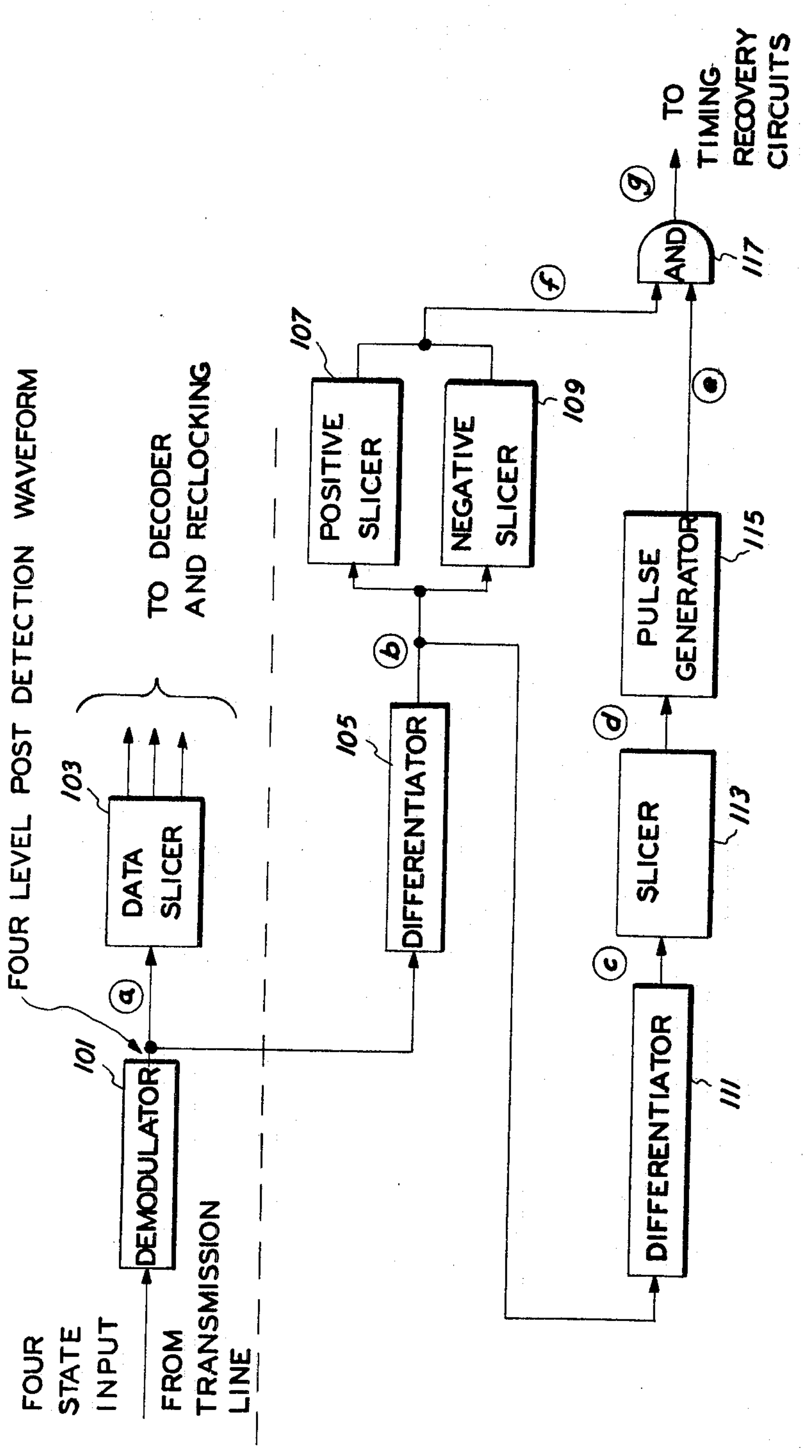
FIG. 1 is a block diagram of the data receiver in accordance with a first aspect of the present invention.
Figure 2:
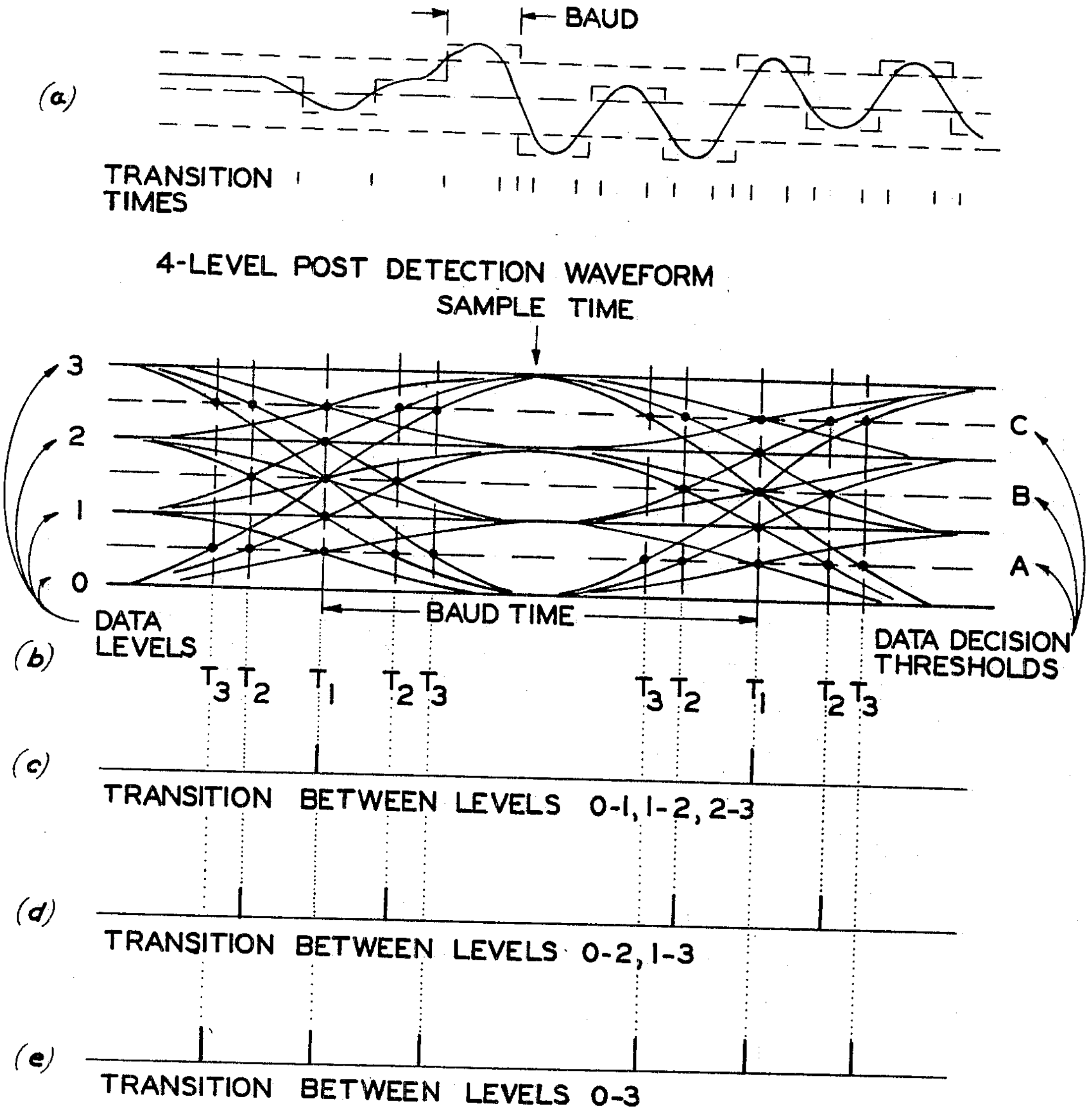
FIG. 2 shows various waveforms helpful in understanding the principles of the present invention.

Referring now to FIG. 1, there is shown a block diagram of the first embodiment of the invention as applied to a four level data receiver employing envelope detection. A typical post detection waveform, as from the output of demodulator 101, is shown in FIG. 2*a* for a four level system. A superposition of all of the possible transitions from one level to another forms the familiar "eye" pattern shown idealized in FIG. 2*b*. Data decisions are based on the threshold levels indicated and are made at the middle of the baud time. Ideally, the transitions occur at times $T_1$. However, certain transitions produce threshold crossings at times $T_2$ or at both $T_1$ and $T_3$ so that these thresholds cannot be used directly to identify the data transitions.

For a transition from the zero data level to data level three, as seen in FIG. 2*b*, the signal waveform crosses the three data decision thresholds at $T_3$, $T_1$ and $T_3$ as indicated. These transitions are shown in FIG. 2*e*. For a transition between data level one and data level three, for another example, the data waveform can be seen to cross two data decision thresholds to give the transitions as indicated at FIG. 2*d*. A transition from data level zero and data level one crosses the data decision threshold at time $T_1$ as indicated in FIG. 2*c*. It can be seen, therefore, that the only transitions that occur at the time $T_1$ to allow for synchronization, are the transitions between the data level zero to one, one to two, two to three, and vice versa. The other transitions occur at times other than $T_1$ which are not at the times necessary for receiver synchronization.

Figure 3:
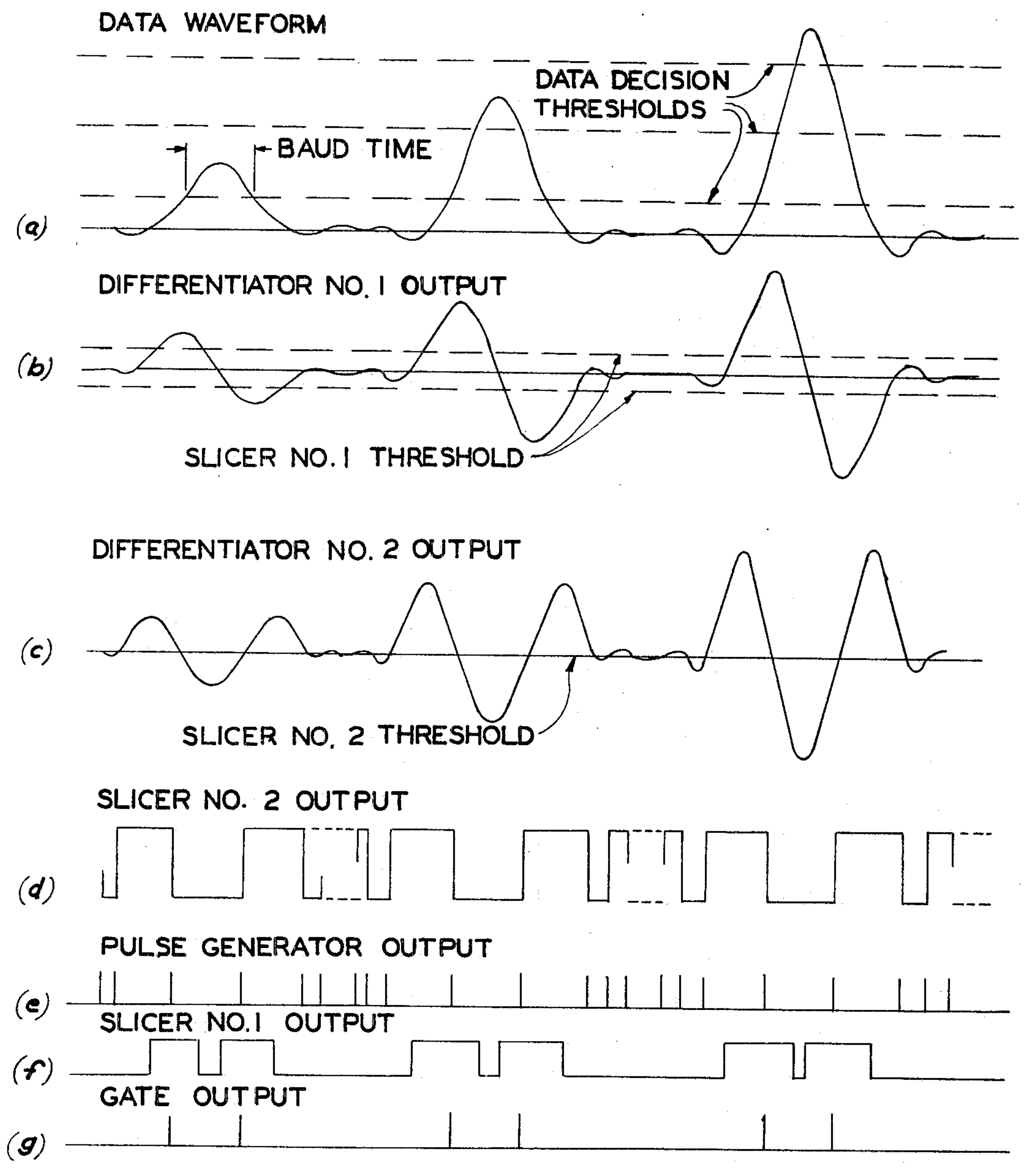
FIG. 3 shows various waveforms helpful in understanding the invention as shown and described in FIG. 1.

FIG. 3 illustrates the particular waveforms of the circuit in FIG. 1 in the production of only one pulse at the desired time for each data transition in accordance with the principles of the present invention. The particular data waveform was chosen for ease of showing the unwanted overshoots which invariably occur in band-limited waveforms. The operation would be similar, however, for any combination of transitions. The four state data information would be fed to the demodulator 101 from the transmission line. The output four level post detection waveform from demodulator 101 is shown as the waveform in FIG. 3*a*. This waveform is then coupled to data slicers 103 and differentiator 105. The output from the data slicers 103 are the information data to be reduced to binary or other pulse configuration. From the slicers 103 the information would be fed to a data decoder for reconstruction of the original information waveform and for subsequent reclocking in accordance with the timing signals as recovered from the transition information derived by the rest of the circuit as to be hereinafter described. The post detection waveform from demodulator 101 is also fed to differentiator 105. The differentiator 105 produces a waveform, seen in FIG. 3*b*, with peaks corresponding in time to the steepest part of the data transitions, seen in FIG. 3*a*, which ordinarily corresponds to the midtime between beginning and end of the transition regardless of which levels the transition occurs between.

From the differentiator 105 the waveform seen in FIG. 3*b* is fed to positive and negative slicers 107 and 109, respectively, and to a second differentiator 111. The differentiator 111 produces a zero crossing corresponding to the peak of the output of the first differentiator 105, i.e., corresponding to the desired data transition. This waveform is seen at FIG. 3*c*. This enables more accurate identification of the transition time by slicing at the zero level, at slicer 113, which creates a very steep waveform at the threshold cross-over times, seen at FIG. 3*d*. From slicer 113 the waveform is then passed to the pulse generator 115, which creates a positive pulse corresponding to each zero crossing, both positive and negative. These pulses are suitable for use by a timing recovery system at the output of the disclosed circuit. The output, however, of the pulse generator 115 may also contain spurious pulses corresponding to overshoot inflections at the beginning and end of the data transitions. In order to eliminate these spurious pulses, the positive and negative slicers 107 and 109 are used to form a gating waveform corresponding to the duration of the output of differentiator 105 at certain positive and negative amplitudes.

The gating waveform, seen at FIG. 3*f*, is therefore guaranteed to straddle the desired pulse as shown at FIG. 3*f*, even if the waveforms are jittered. Utilizing AND gate 117, with the waveform at FIG. 3*f* together with the output of the pulse generator 115, at the input thereof, the extraneous timing pulses are eliminated. The slicing levels of the positive and negative slicers 107 and 109 are not critical with regard to the width of the gating pulse, but must be set at an amplitude which avoids the unwanted overshoots. They may be set around the midpoint of the lowest output of the first differentiator 105, i.e., the output corresponding to the shallowest data transition, a transition between two adjacent levels.

Alternative to the positive and negative slicers 107 and 109, in FIG. 1, a full wave rectifier and a single slicer may be utilized. If the differentiator 111 would receive the output from the full wave rectified output of differentiator 105, the wanted transitions in the output of the differentiator 111 would all be of the same polarity and would eliminate the pulse rectification which is implied in the pulse generator 115 of FIG. 1. Only one slicer, therefore, would be necessary in place of the positive and negative slicers 107 and 109 due to the fact that there is only one slicing threshold to produce the gating waveform.

The individual circuits for each of the receiver stages described herein are well known in the art, and for that reason, it is believed unnecessary to describe or show such circuits in detail, It should also be pointed out that any appropriate known circuit may be used for the individual receiver circuits described above, and that such circuits form no part of the present invention.

Figure 4:
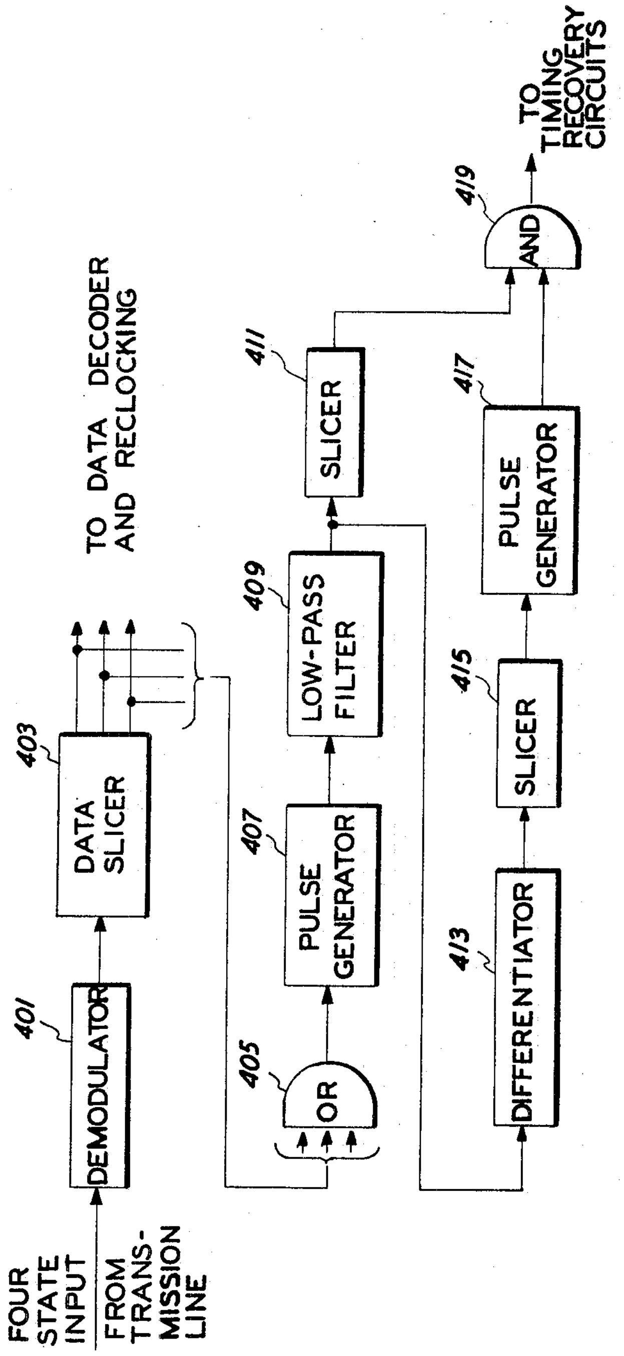
FIG. 4 is a block diagram of a data receiver in accordance with a second embodiment of the present invention.

If the transmitted data waveform is so distorted that the overshoots have slopes approaching the slope of the adjacent level transitions, it may be difficult to set the thresholds of the positive and negative slicers 107 and 109, as shown in FIG. 1, so as to slice the lowest wanted peak of the waveforms in FIG. 3*b* without including unwanted peaks. In this event, therefore, an alternate solution as a second embodiment which can be employed is shown in FIG. 4.

In the same manner as described in FIG. 1, the multilevel signal input from a transmission medium is coupled to the demodulator 401 to obtain the multi-level post detection waveform at the output of the demodulator 401. This waveform is applied to data slicer 403 for recovery of the specific levels involved with each of the data information signals. Instead of utilizing the post detection waveform from the output of the demodulator 401, the output from data slicers 403 is utilized. As seen in FIG. 4, the output from data slicers 403 is applied to the input of OR gate 405 to a pulse generator 407.

Figure 5:
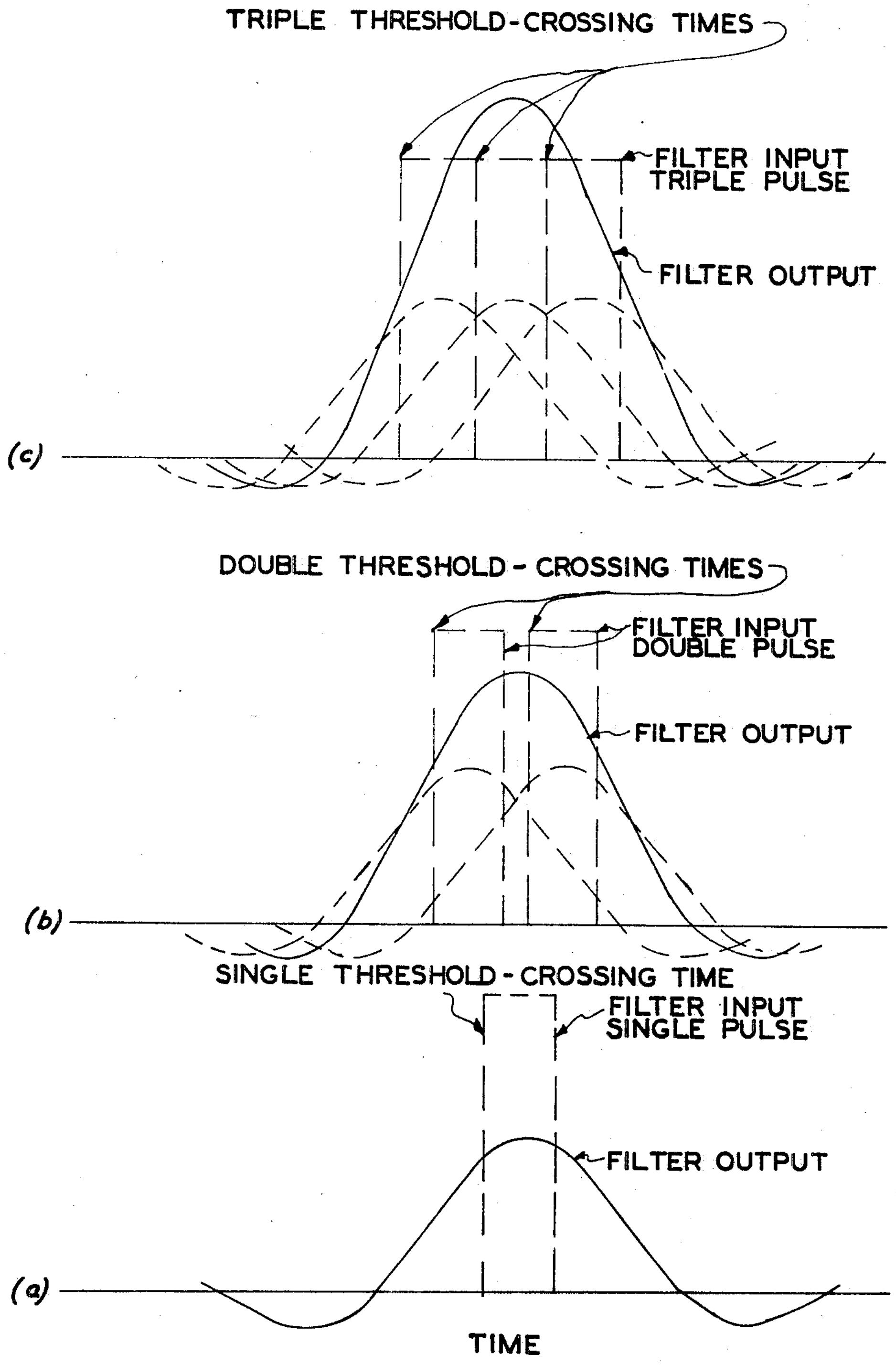
FIG. 5 shows various waveforms helpful in understainding the data receiver as shown and described in conjunction with FIG. 4.

Positive pulses are formed from all the threshold crossings at the output of the data slicers 403. For a four-level system the pulse width is set to about ¼ the baud time, which approximates the distance between the triple crossings of the data thresholds as shown in FIGS. 2*b* and 2*e*. This results in either a single pulse, two adjacent pulses that are separated by about 1/12 the baud time, or three consecutive pulses with no separation. Jitter would, of course, modify these positions slightly, but will not negate the desired end result. The pulse train as obtained from the output of pulse generator 407 is passed through a low pass filter 409, which is too narrow to pass these pulses without widening them. The result in each case is a single smooth pulse with one maximum point, differing only in amplitude, as shown in FIGS. 5*a*, *b*, and *c*. The maxima always occur at the same relative time. This waveform takes the place of the waveform in FIG. 3*b*. In this case, however, the waveform is always positive so that only one slicing level, as at slicer 411 with no rectifier being required. This signal can be sliced more reliably than the noisy input information signal because the overshoots depend principally on the filter characteristics rather than on the transmission channel, whose characteristics are not well controlled. Subsequent processing is as described previously, i.e., the waveform is differentiated to produce a zero crossing, now always of the correct polarity, pulses are made from the zero crossings and gated to remove spurious pulses.

The criterion on the low pass filter 409 is that it must have a low enough cut-off to insure that the double pulses, FIG. 5*b*, produce a definite peak, but high enough cut-off so that successive transitions do not interfere. The worst case for potential interference is successive transitions causing triple threshold crossings. The peak of the filter response to one triple threshold crossing must not be significantly disturbed by adjacent transitions. The figures were drawn with an "ideal" filter; unity output from zero to cut-off frequency, $f_0$ and zero response beyond $f_0$. A filter with cosine roll-off would reduce the response overshoots and thus also reduce potential interference.

In the foregoing, there has been disclosed methods and apparatus for recovering the information of baud timing of an original data waveform. While the present invention, as to its objects and advantages, as described herein, has been set forth in specific embodiments thereof, they are to be understood as illustrative only and not limiting.

What is claimed is:

1. In an information detection system where a transmitted multi-state data waveform is shifted between a plurality of frequencies in accordance with the separate data levels in said transmitted data, the method of extracting the signals required for restoring data timing synchronization comprising:
- differentiating said data waveform to generate a first output waveform with amplitude peaks corresponding in time relation to the steepest part of the data transitions between the data levels;
- slicing said differentiated waveform into a square wave gating waveform corresponding to the duration of the amplitude peaks above a predetermined amplitude;
- further differentiating said first differentiated waveform to generate a second output waveform with the zero crossings corresponding in time relation to the peaks of the first differentiated waveform;
- further slicing said second differentiated waveform into a square-wave waveform corresponding to the duration of the amplitude peaks above the slicing threshold level;
- generating pulses corresponding to the positive and negative edges of the last-mentioned square-wave waveform; and
- transmitting the generated pulses that occur within the pulse width of the gating waveform derived from the first output waveform.

2. In a data communication receiver for reproducing a transmitted multi-state data waveform including a detector for producing in response to said data waveform a series of pulse transitions having different amplitudes with respect to a reference axis, a circuit for extracting the signals required for restoring data timing synchronism comprising:
- first circuit means for generating an output waveform with amplitude peaks corresponding in time relation to the steepest part of the pulse transitions of said data waveform;
- second circuit means for generating square wave pulses corresponding to the time duration of said first circuit means output waveform above a predetermined amplitude;
- third circuit means coupled to said first circuit means for generating an output waveform with the zero crossings corresponding in time relation to the amplitude peaks in the output waveform from said first circuit means;
- fourth circuit means for generating square wave pulses corresponding to the time duration of said third circuit means output waveform above a predetermined threshold amplitude level;
- fifth circuit means for generating pulses corresponding to the positive and negative edges of said square wave pulses from said fourth circuit means; and
- sixth circuit means coupled to said second and fifth circuit means for transmitting those pulses generated by said fifth circuit means that occur within the pulse width of the square wave pulses from said second circuit means.

3. In a data transmission system, a circuit for recovering the data timing at a receiver of a transmitted multi-state signal waveform comprising:
- first differentiating means for differentiating said signal waveform and producing an output waveform with amplitude peaks corresponding in time to the steepest amplitude part of the data transitions between the data states;
- first slicing means responsive to said differentiated waveform for generating a square wave gating waveform corresponding to the duration of the output of said first differentiator above a predetermined amplitude;
- second differentiating means coupled to said first differentiating means for differentiating said differentiated waveform to produce an output waveform with the zero crossings corresponding in time relation to the peaks of the output waveform from said first differentiating means;
- second slicing means for generating a square wave waveform at the times at which said second differentiated waveform crosses the threshold level of the second slicing means;
- pulse generating means responsive to said square wave waveform from said second slicing means for generating positive pulses corresponding to the positive and negative zero crossings of said square wave waveform; and
- gating means coupled to said pulse generating means and said first slicing means for transmitting those positive pulses from said pulse generating means that occur simultaneously with the gating waveform from said first slicing means.

4. In a data transmission system, a circuit for recovering the data timing of a transmitted multi-level signal waveform at a receiver comprising:
- data slicing means for recovering the specific levels associated with said signal waveform;
- first pulse generating means coupled to said data slicing means for producing a pulse train having a duration proportional to the recovered levels of said signal waveform;
- filter means connected to the output of said first pulse generating means for producing a single pulse with an amplitude proportional to the duration of the generated pulse train, the maximum amplitude of each pulse generated by said filter means occurring at the same time;
- means connected to the output of said filter means for differentiating the output thereof and producing a waveform with the zero-crossings corresponding in time relation to the maximum amplitude of the pulse generated by said filter means;
- first slicing means responsive to the output of said filter means for generating a square wave gating waveform corresponding to the duration of the output of said filter means above a predetermined amplitude;
- second slicing means for generating a square wave waveform at the times at which said differentiated output crosses the threshold level of said second slicing means;
- second pulse generating means responsive to the output of said second slicing means for generating positive pulses corresponding to the positive and negative zero-crossings of said square wave waveform output; and
- gating means coupled to said second pulse generating means and said first slicing means for transmitting those positive pulses from said pulse generating means that occur simultaneously with the square wave gating waveform from said first slicing means.

(References on following page)

References Cited

UNITED STATES PATENTS

| | | | |
|---|---|---|---|
| 2,421,138 | 5/1947 | Wheeler | 328—163 |
| 2,867,767 | 1/1959 | McGillem et al. | 328—165 XR |
| 2,975,367 | 3/1961 | Adams et al. | 328—114 |
| 3,095,541 | 6/1963 | Ashcraft | 328—115 |
| 3,209,261 | 9/1965 | Critchlow | 328—114 XR |
| 3,327,230 | 6/1967 | Konian | 328—164 |

| | | | |
|---|---|---|---|
| 3,408,581 | 10/1968 | Wakamoto et al. | 328—109 XR |
| 3,437,834 | 4/1969 | Schwartz | 307—235 |

DONALD D. FORRER, Primary Examiner

S. T. KRAWCZEWICZ, Assistant Examiner

U.S. Cl. X.R.

328—109, 114, 117, 127, 150, 164; 307—235, 264